United States Patent [19]
Brizzolara et al.

[11] 3,912,676
[45] Oct. 14, 1975

[54] POLYCHLOROPRENE-TACKIFYING RESIN DISPERSIONS

[75] Inventors: Donald Francis Brizzolara, Wilmington, Del.; Robert Roth Garrett, West Chester, Pa.

[73] Assignee: E. I. Du Pont de Nemours and Company, Wilmington, Del.

[22] Filed: May 30, 1973

[21] Appl. No.: 365,275

[52] U.S. Cl. ..... 260/27 BB; 260/29.3; 260/29.7 RP; 260/29.7 H; 260/845; 260/847
[51] Int. Cl.² .................. C08L 93/00; C08L 61/06
[58] Field of Search ... 260/29.3, 844, 845, 29.7 DP, 260/847, 29.7 RP:29.7 H, 27 BB

[56] References Cited
UNITED STATES PATENTS

| | | | |
|---|---|---|---|
| 2,564,291 | 8/1951 | Wolf | 260/29.3 |
| 2,902,458 | 9/1959 | Teppema | 260/845 |
| 3,361,693 | 1/1968 | Geschwind | 260/29.3 |
| 3,703,568 | 11/1972 | Kadowaki et al. | 260/845 |

*Primary Examiner*—Lorenzo B. Hayes

[57] ABSTRACT

A process is provided for making novel chloroprene-unsaturated carboxylic acid copolymer latexes having tackifying resin intimately dispersed therein, the latexes having characteristics making them especially suitable for use in nonsolvent adhesives. The process includes the steps of (1) preparing a water-immiscible solution containing the chloroprene monomer, an alpha,beta-unsaturated carboxylic acid monomer, and a tackifying resin, (2) emulsifying this solution in water containing polyvinyl alcohol, and (3) copolymerizing the monomers in the emulsion so formed; the chloroprene-carboxylic acid mixture of step (1) containing 0.4–10 mole percent of the carboxylic acid based on the total of chloroprene plus carboxylic acid and the tackifying resin being present in said mixture in the proportion of 5–75 parts, and the polyvinyl alcohol (PVA) being present in step (2) in the proportion of 2–10 parts, all of said proportions being by weight per 100 parts of total chloroprene plus carboxylic acid monomer.

2 Claims, No Drawings

3,912,676

POLYCHLOROPRENE-TACKIFYING RESIN DISPERSIONS

BACKGROUND OF THE INVENTION:

Chloroprene polymers (neoprenes) are widely used in adhesives, both in latex and solvent form. Because of hazards involved in the use of organic solvents, aqueous latex adhesives are becoming increasingly important. There is a need for new latex compositions which will be useful in a variety of adhesive applications.

It is conventional to use various resins along with the chloroprene polymers in the formulation of adhesives. The chloroprene polymer serves as the film-forming component in the adhesive. The additional resin, often referred to as a "tackifying" or "reinforcing" resin, improves adhesion to specific surfaces and often aids in obtaining "quick grab" and in improving tack life and cohesive strength of the adhesive film.

To obtain the best adhesive properties, it is necessary that the resin and the polychloroprene be brought into intimate contact and thoroughly mixed. For some purposes, it is sufficient to add the resin as a finely divided dispersion in water or as an aqueous emulsion of a solution of the resin. More intimate mixing can be effected by a multiple-step procedure in which the chloroprene polymer is first isolated, the polymer and resin are dissolved in a mutual solvent, the resulting solution is emulsified in water with a suitable surface active agent, and the solvent is partially or completely removed, for example, by distillation. This method is inconvenient and, in addition, is attended by the hazards involved in the use of solvents.

An alternative procedure might seem to be to add the resin to the chloroprene before polymerization. Efforts to do this have up to now been unsuccessful, because the resin inhibits the polymerization. This invention provides such a process.

Another disadvantage of conventional chloroprene polymer latex adhesives as compared with solvent adhesives has been that the former provide a poorer balance of tack life and bond strength and that improvement in one respect has been possible only at the expense of the other. The products of this invention include latexes suitable for use in adhesives which provide good balance in tack life and bond strength. Tack life, as used in this application, is the interval between the time the applied latex adhesive is sufficiently dry to permit assembly of the joint and the time when it is no longer possible to obtain a satisfactory bond by pressure alone.

It has been proposed, in Kadowaki et al. U.S. Pat. No. 3,703,563, to add PVA to chloroprene to improve the stability against "layering" of adhesives made therefrom. Conventional additives may be included in such adhesives, but the problem of layering is not that solved by the present invention, and the patent is not concerned with the problem of making intimate mixtures of chloroprene polymers and tackifying resins.

SUMMARY OF THE INVENTION

Now, according to the present invention, it has been found that the above-discussed difficulties of the prior art can be overcome and that novel polychloroprene latex-tackifying resin dispersions having characteristics making them highly suitable for use in latex adhesives can be produced by processes comprising the steps of (1) preparing a water-immiscible solution containing the chloroprene monomer, an alpha, beta-unsaturated carboxylic acid monomer, and a tackifying resin, (2) emulsifying the solution in water containing polyvinyl alcohol, and (3) copolymerizing the monomers in the emulsion so formed; the chloroprene-carboxylic acid mixture of step (1) containing 0.4–10 mole percent of the carboxylic acid based on the total of chloroprene plus carboxylic acid and the tackifying resin being present in said mixture in the proportion of 5–75 parts, and the PVA being present in step (2) in the proportion of 2–10 parts, all of said proportions being by weight per 100 parts of total chloroprene plus carboxylic acid monomer.

DESCRIPTION OF THE PREFERRED EMBODIMENTS

THE COMPONENTS USED

The alpha, beta-unsaturated carboxylic acids which can be used as comonomers in preparing the copolymers of the invention can be represented by the following structure:

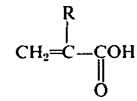

wherein R is hydrogen, an alkyl radical containing one to four carbon atoms, or a carboxymethyl radical. Examples of suitable compounds are acrylic acid, methacrylic acid, 2-ethylacrylic acid, 2-propylacrylic acid, 2-butylacrylic acid, and itaconic acid [2-(carboxymethyl)acrylic acid]. Of these, the preferred acid is methacrylic acid because of its reactivity and ready availability.

The PVA's are commercially available materials. For a discussion of PVA's, see Encyclopedia of Polymer and Technology, Interscience Publishers, Vol. 14, page 149 and following, 1971. Any PVA can be used which will dissolve in the aqueous polymerization system at the temperature of the polymerization. These are, in general, those PVA's having a mole percent hydrolysis of 80–99% and a degree of polymerization of 350–2500. The preferred PVA, because of its solubility characteristics, has a degree of polymerization of 500–600 and a mole percent hydrolysis of 87–89%.

Both the carboxylic acid comonomer and the polyvinyl alcohol are required in the polymerization system, since without these components the colloidal stability is not adequate in the presence of the resin.

At least 0.4 mole percent of the carboxylic acid is required to have a significant effect. More than 10 mole percent is undesirable because the resulting latex will have poor shelf stability with respect to viscosity and gelation. The preferred proportion is 1–5 mole percent, with 2–4 mole percent being particularly preferred.

The amount of PVA required in the system is at least 2 parts per 100 parts of total monomer, with 4–6 parts being the preferred range. No More than 10 parts of PVA is required, and a larger amount results in excessive emulsion viscosities.

The colloidal stability of the system during and after polymerization may optionally be enhanced by the addition, before or after polymerization, of an acid-stable surface active agent. Typical of these are the surface active agents containing sulfate or sulfonate groups such as the water-soluble salts of naphthalene-or $C_{1-4}$-alkylnaphthalenesulfonic acids or formaldehyde condensates thereof, sulfated fatty alcohols containing 8–18 carbon atoms, alkylbenzenesulfonic acids containing 8–18 carbon atoms in the alkyl chains, or sulfated condensates of phenol, $C_{1-18}$-alkylphenols, or $C_{8-18}$-fatty alcohols with ethylene oxide. The cations of the salts are usually sodium, potassium, or ammonium ions. Up to 10 parts per weight per 100 parts of monomers can be used without deleterious effects on the adhesive. The upper limit is largely a matter of economics and an increased water sensitivity of the final adhesive films. A particularly preferred range is 2–5 parts per 100 parts of monomer.

The tackifying resins used in practicing this invention are the normally solid tackifying or reinforcing resins conventionally used in chloroprene polymer adhesives. The resin should be soluble in the chloroprene monomer. Suitable resins include the oil-soluble phenolic resins which may be either thermosetting (that is, heat reactive) or thermoplastic types. The resins most often used are the heat-reactive phenol-aldehyde resins prepared by reacting one mole of a para-substituted phenol with 1–2 moles of an aldehyde (usually formaldehyde) in the presence of an alkaline condensation catalyst. Phenols substituted in the para-position with alkyl groups having 3–8 carbon atoms are useful in preparing these resins. Examples of such phenols include p-isopropylphenol, p-tert-butylphenol, p-cyclohexylphenol, p-tert-amylphenol, and p-octylphenol. Resins derived from p-tert-butylphenol are especially preferred and readily available. Aryl-substituted phenols, such as p-phenyl and p-tolylphenols, may also be used.

The thermoplastic, oil-soluble phenol-aldehyde resins generally have moderately low molecular weight, are relatively free of cross-linking, and usually contain hydrocarbon substituents which confer oil solubility. Representative resins include terpene-modified phenolic resins, furfural-phenolic resins, and phenol-modified coumarone-indene resins. Of the thermoplastic phenolic resins, the terpene-modified phenolics are preferred. These materials are available commercially. They may be made by the acid condensation of terpene hydrocarbons or terpene alcohols with phenol, followed by the catalytic resinification of the substituted phenol with formaldehyde.

Other types of suitable resins include hydrocarbon resins, often called coumarone-indene resins, coal tar resins or petroleum resins. For a discussion of resins of this type, see "Resins in Rubber", by Gardner L. Brown, Pennsylvania Industrial Chemical Corp., 1969.

A particularly suitable type of hydrocarbon tackifying resin includes the cyclopentadiene polymers. These are available commercially under the trademark "Piccodiene" from the Pennsylvania Industrial Chemical Corp.

The amount of resin to be used ranges from about 5 to about 75 parts per 100 parts of monomer. At least 5 parts is required to have a significant reinforcing effect, and more than 75 parts reduces tack and impairs the elasticity of the dried adhesive film. The preferred range is between 20–45 parts per 100 parts of monomer.

As is conventional in the preparation of chloroprene polymers, a chain-transfer agent will be present in the polymerization system to control the molecular weight and solubility characteristics of the polymer. The amount of chain-transfer agent is not a critical part of this invention and will depend on the use to be made of the latex. The determination of the desirable amount will be within the scope of one skilled in the art. If an adhesive having long tack life is desired, sufficient chain-transfer agent should be present in the polymerization system in order that the polymer will be a sol polymer, that is, a polymer soluble in such polymer solvents as benzene, toluene, or tetrahydrofuran. Although the presence of a minor amount, such as up to 10%, of gel (a solvent-insoluble component) may be tolerated and may improve cohesive strength, presence of more than this amount of gel is detrimental to tack. The preferred amount for maximum tack is the amount just sufficient to prevent a significant amount of gel formation at 80–100% monomer conversion.

For certain uses such as in caulking compounds and mastics, materials may be required which have tack life and flow characteristics different from those required for a contact bond adhesive. For such compositions, a larger gel fraction will be required to impart desirable flow properties. This fraction may range from 30–70 weight percent of the polymer. When the latex is to be used for coatings which should dry tack-free but for which high cohesive strength and resistance to flow at elevated temperatures are important, gel contents may range from 60–90%.

In general, the range of chain-transfer agent will be from about 0.3 to about 2 parts per 100 parts of the monomer mixture. The chain-transfer agents most often used are the alkyl mercaptans and dialkyl xanthogen disulfides.

It is to be understood that a small amount, up to about 10%, of the chloroprene can be replaced with another copolymerizable monomer which does not contain a free carboxylic acid group. Representative comonomers that can be used in the process include vinyl aromatic compounds such as styrene, the vinyl toluenes, and vinyl naphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amides, and nitriles of acrylic and methacrylic acids, such as ethyl acrylate, methyl methacrylate, methacrylamide, and acrylonitrile.

THE DISPERSION PROCESS

The process is carried out by dissolving the resin in the monomers and emulsifying this mixture in water. The emulsion also contains the chain-transfer agent, the PVA, and, if used, the acid-stable surface active agent. The concentration of the monomer in the emulsion is not critical but will usually range from 40–55%.

The pH of the polymerization emulsion is on the acid side in order to incorporate the carboxylic comonomer. The preferred pH is 2–4.

Polymerization is initiated and maintained by adding a free radical polymerization catalyst such as organic or inorganic peroxy compounds with suitable reducing agents. Examples of suitable redox systems are potassium persulfate with potassium sulfite and cumene hydroperoxide with sodium hydrosulfite.

The temperature of polymerization may range from 20°–55°C, preferably between 40°–50°C.

The polymerization is preferably carried to as high monomer conversion as possible; the preferred conversion is at least 80% with at least 90% being especially desirable. High conversions are desirable in order to incorporate as much as possible of the less reactive carboxylic comonomer. Also, the polymer prepared at less than 80% conversion tends to have poorer cohesive properties than polymers prepared at higher conversions.

If desired, polymerization can be stopped by addition of conventional short-stopping agents, such as those disclosed in U.S. Pat. No. 2,576,009. Unreacted monomer can be removed by steam-stripping, as disclosed in U.S. Pat. No. 2,467,769. Optionally, the latex can be neutralized or made basic before or after removal of monomer by addition of sodium hydroxide, potassium hydroxide, aqueous ammonia, or organic bases such as diethanolamine, and triethanolamine. It is preferred, for optimum storage stability, that the latex contain an excess of alkaline material or a buffering system to react with hydrochloric acid which the polymer slowly loses during storage.

The latexes of this invention have broad particle size distributions; the particles range from about 0.01 to about 4 microns in diameter. Microscopic studies indicate that some of the particles contain both polymer and resin particles dispersed in each other.

Films cast from the latex show an unusual resistance to discoloration on aging and light exposure.

The latexes prepared according to this invention are highly useful in the preparation of contact bond adhesives, including many having unusually good tack life and bond strength. They may also be used in coatings, caulks and mastics, and similar applications. They should be compounded with a suitable acid acceptor and preferably with an antioxiddant. Zinc oxide (2–15, preferably 5–10, parts per 100 parts of polymer) may be used as the acid acceptor. For optimum self-tack, it is preferred to use an acid acceptor which does not react with the carboxylic acid groups of the carboxylic acid monomer. Examples of suitable acid acceptors of this type include calcium carbonate and various coated zinc oxides such as those disclosed in British Pat. No. 948,709, and epoxy compounds such as phenyloxirane (styrene oxide) and the epoxy resins which are condensates of glycidol with bisphenol A (p,p'-isopropylidenediphenol) or glycerol.

The conventional antioxidants such as secondary aromatic amines and hindered phenols are usually added in an amount 1–5 parts per 100 parts of polymer.

Other additives may include curing agents such as dipentamethylene thiuram tetrasulfide (for increased hot-bond strength); fillers such as clays and silicas (to control viscoelastic properties); and softening agents such as rosin derivatives and liquid resins which are of the same general types as the solid tackifying agents described above except that they have lower molecular weights.

The method of preparation of assemblies using the latex as an adhesive will, in general, follow conventional procedures and are not within the scope of this application.

EXAMPLES

The invention will be better understood by reference to the following illustrative examples, in which parts and percentages are by weight unless otherwise indicated.

The general procedure used in preparing the latexes is as follows:

Two solutions are prepared, one containing the monomers, the chain-transfer agent, and the resin or resins to be used, the other containing water and the PVA. An emulsion is prepared of these two solutions.

Polymerization of the monomers is carried out in a reaction flask equipped to provide for nitrogen purge, specific gravity measurement, stirring, and heating.

The PVA used in the Examples has a degree of hydrolysis of 87–89% and a degree of polymerization of 500–600 ("Elvanol" 51–05, E. I. du Pont de Nemours and Co.)

EXAMPLE 1

The recipe based on 100 parts of monomer is as follows:

|  | Parts by Weight |
| --- | --- |
| Chloroprene | 98 |
| Methacrylic acid | 2 |
| Diisopropyl xanthogen disulfide | 1 |
| Phenolic resin (a) | 30 |
| Water | 100 |
| PVA | 5 |

(a) The phenolic resin is an oil-soluble, heat-reactive resin prepared by reacting 1–2 moles of formaldehyde with one mole of p-tert-butylphenol under alkaline conditions ("Bakelite" CKM-1634, Union Carbide Corp.).

Because of the closeness of the molecular weights of chloroprene (88.5) and methacrylic acid (86), the mole percent of the two ingredients corresponds essentially to the parts per 100 parts of total monomer.

After purging the reaction vessel with nitrogen, polymerization is carried out at 40°C by addition, as required, of cumene hydroperoxide and an aqueous solution of sodium hydrosulfite ($Na_2S_2O_4$). Polymerization is stopped in 10 hours at 92% monomer conversion.

A sample of the latex is neutralized to a pH of 7–8 with ammonium hydroxide. To 50 g of the neutralized latex is added 1.5 g of styrene oxide in the form of a 50% water emulsion and 0.6 g of 4,4'-thiobis(6-tert-butyl-m-cresol), an antioxidant, in the form of a 40% water emulsion.

Test specimens are prepared by applying three or four coats (enough to cover the weave) to each of two 1-inch wide strips of unsized No. 10 canvas duck. Thirty to sixty minutes drying time is allowed between coats. The pieces are pressed together while slightly wet and aged for one day at room temperature.

The adhered pieces of canvas are pulled apart using an Instron tensile tester at a head speed of 2 in./min. (One end of the test sample is left uncoated so that the test assembly may be fastened in the jaws of the tensile testing machine.) The force required to separate the test pieces is measured. This is reported as pounds per linear inch (pli). One specimen is pulled at 25°C and another at 60°C. The results are as follows: ,140

EXAMPLE 2

The recipe used in this Example is as follows:

| | PARTS BY WEIGHT |
|---|---|
| Chloroprene | 97 |
| Methacrylic acid | 3 |
| Diisopropyl xanthogen disulfide | 1.4 |
| Phenol-formaldehyde resin (a) | 30 |
| Hydrocarbon resin (b) | 7.5 |
| Water | 110 |
| PVA | 5 |

(a) Resin prepared by reacting 1–2 moles of formaldehyde with 1 mole of p-tert-butylphenol, under alkaline conditions ("Bakelite" CKM 1834, Union Carbide Corp.).
(b) Polydicyclopentadiene having a softening point of 105°C and a specific gravity at 25°C of 1.11 ("Piccodiene" 6215, Pennsylvania Industrial Chemical Corp.).

Polymerization is carried out as in Example 1 to a monomer conversion of 85–90%. Polymerization is stopped by adding an emulsion containing equal parts of phenothiazine and 4-tert-butylpyrocatechol (about 0.02 part per 100 parts of monomer) and the latex is neutralized to pH with 8–10% sodium hydroxide. To the latex are added 5 parts per 100 parts of monomer of the ammonium salt of a sulfate ester of an alkylphenoxypoly(ethyleneoxy)ethanol ("Alipal" CO-436, General Aniline and Film Corp. The surface active agent is added as a 58%, percent aqueous solution, but the parts given are based on active ingredient) and 2 parts of 2,2'-methylenebis(6-tert-butyl-p-cresol), added as an aqueous dispersion. Unreacted monomer is then removed from the latex. A dispersion is prepared containing the following:

| | Parts by Weight |
|---|---|
| Water | 50 |
| Zinc oxide ("Kadox-15", New Jersey Zinc Co.) | 25 |
| Coated zinc oxide ("Photox-85", a coated zinc oxide, New Jersey Zinc Co.) | 25 |

Three parts of the freshly prepared dispersion are added to 50 parts of the latex and the resulting composition is used on coat two 1 inch × 6 inch samples of cotton duck. About four coats are applied, which is enough to cover the weave of the cloth. About one hour open-face drying time is allowed between coats, and the last coat is given about a two-hour drying time before the two pieces are joined by finger pressure.

Further drying of about one week is allowed before the peel adhesion is determined as in Example 1. The results are as follows:

| | Pli |
|---|---|
| 25°C | 35 |
| 60°C | 16 |

The tack time afforded by the addhesive is at least 16 hours.

EXAMPLE 3

In this Example, the recipe is the same as in Example 2 except that 15 parts of the hydrocarbon resin and 120 parts of water are used. Polymerization is carried out to a monomer conversion of about 73%. Polymerization is stopped as in Example 2. The latex is neutralized, and a surface active agent and an antioxidant are added before stripping of monomer as described in Example 2.

A freshly prepared aqueous dispersion of a coated zinc oxide ("Photox" 85) is added in an amount to give 3 parts of zinc oxide per 100 parts of latex. Samples of canvas are coated as in Example 2, and the pieces are allowed to dry after the last coat for varying lengths of time before assembling, as shown in the table (open time). After the indicated open time, the pieces are pressed together by hand, and the bond strengths are measured. The table shows the results.

| OPEN TIME, HOURS | PLI, 25°C | PLI, 60°C |
|---|---|---|
| 1 | 26 | 10 |
| 3 | 30 | 9 |
| 26 | 30 | 11.5 |
| 124 | 33 | 10 |
| 172 | 22.5 | 9 |
| 220 | 20 | 10 |

EXAMPLE 4

The recipe used in this Example is as follows:

| | PARTS BY WEIGHT |
|---|---|
| Chloroprene | 98 |
| Methacrylic acid | 2 |
| Diisopropyl xanthogen disulfide | 1 |
| Polydicyclopentadiene resin (same as in Example 2) | 30 |
| Methyl ester of hydrogenated rosin (a) | 10 |
| Water | 100 |
| PVA | 5 |
| Acid-stable surfactant (b) | 0.24 |

(a) "Hercolyn" D, Hercules Inc.
(b) "Alipal" CO-436, General Aniline and Film Corp., a 58% aqueous solution of an ammonium salt of a sulfate ester of an alkylphenoxypoly-(ethencoxy)ethanol.

Polymerization is carried out at 40°C using the same catalyst system as in Example 1 to a 97% conversion. Polymerization is stopped by adding an emulsion containing equal amounts of phenothiazine and 4-tert-butylpyrooatechol as in Example 2. The latex is stripped of monomer without neutralization. The latex contains about 58% solids.

This latex is particularly suitable for blending with other adhesive-grade chloroprene polymers for preparation of contact bond adhesives as shown below.

Fifty parts of the latex are mixed with an equal weight of a latex of a conventional rapid-crystallizing polychloroprene, and to the mixture is added 10 parts of a coated zinc oxide. The bond strengths, when measured as described in Example 2, are as follows:

| | PLI |
|---|---|
| 25°C | 13 |
| 80°C | 10 |

The conventional latex contains about 38% solids and is prepared by polymerizing chloroprene at 10–20°C in the presence of disproportionated rosin as an emulsifying agent and dodecyl mercaptan as a chain-transfer agent.

EXAMPLE 5

In this Example, the recipe for polymerization is as follows:

|  | PARTS BY WEIGHT |
|---|---|
| Chloroprene | 97 |
| Methacrylic acid | 3 |
| Dodecyl mercaptan | 0.8 |
| Phenolic resin (same as Example 2) | 30 |
| Hydrocarbon resin (a) | 5 |
| Water | 120 |
| PVA | 5 |

(a) The hydrocarbon resin is polydicyclopentadiene having a softening point of 103°C and a specific gravity at 25°C of 1.10 ("Piccodiene" 2215, Pennsylvania Industrial Chemical Corp.)

Polymerization is carried out as in Example 2 to a monomer conversion of about 97%. The latex is stabilized against further polymerization as in Example 2. The latex is neutralized to a pH of 8 with 5% aqueous ammonia. To the latex is addded 5 parts per 100 parts of monomer of the same surface active agent as in Example 2. Unreacted monomer is then removed.

To 50 g of the latex is added 1 g of 2,2'-methylenebis(6-tert-butyl-p-cresol) and 1 g of calcium carbonate (each added as an aqueous dispersion) and the resulting composition is applied to canvas as described in Example 2. The pieces are allowed to dry for 2 days before assembly. The dried films show good tack at the end of this time. Two pieces are pressed together by hand and pulled on the Instron tensile tester. The bond strength at 25°C is 18 pli.

We claim:

1. In the process for producing a chloroprene-carboxylic acid copolymer latex having intimately dispersed therein an oil-soluble tackifying or reinforcing resin, soluble in the chloroprene monomer, said resin being selected from the group consisting of para-substituted phenol-formaldehyde resins, coumarone-indene resins, and cyclopentadiene resins;

the improvement comprising the following steps:

1. preparing a solution of the resin in a mixture of chloroprene and $\alpha,\beta$-unsaturated carboxylic acid monomer;
2. emulsifying the solution in water containing polyvinyl alcohol; and
3. polymerizing the monomers in the emulsion so formed in the presence of free-radical catalysts;

the chloroprene-carboxylic acid mixture of Step (1) containing 0.4–10 mole percent of the carboxylic acid based on the total of chloroprene plus carboxylic acid, and the tackifying or reinforcing resin being present in said mixture in the proportion of 5–75 parts; and the polyvinyl alcohol being present in Step (2) in the proportion of 2–10 parts; all parts being by weight per hundred parts of total chloroprene plus carboxylic acid monomers.

2. A chloroprene-carboxylic acid copolymer latex having intimately dispersed therein a tackifying resin, produced according to a process of claim 1.

* * * * *

UNITED STATES PATENT OFFICE
CERTIFICATE OF CORRECTION

PATENT NO. : 3,912,676
DATED : October 14, 1975
INVENTOR(S) : Donald Francis Brizzolara and Robert Roth Garrett It is certified that error appears in the above-identified patent and that said Letters Patent are hereby corrected as shown below:

In column 5, line 39, change "antioxiddant" to -- antioxidant --.

In column 6, line 65, delete ", 140" after "follows:".

In column 6, line 66, insert the following table:

"
|       | PLI | COMPARISON* |
|-------|-----|-------------|
| 25°C  | 33  | 10          |
| 60°C  | 10  | 3           |

*By way of comparison to give a basis for judging the performance of the adhesive, typical results using a commercially available latex adhesive are shown".

In column 7, line 43, change "on" to -- to --.

In column 8, line 45, change "butylpyrooatechol" to -- butylpyrocatechol --.

Signed and Sealed this

Twentieth Day of July 1976

[SEAL]

Attest:

RUTH C. MASON
*Attesting Officer*

C. MARSHALL DANN
*Commissioner of Patents and Trademarks*